United States Patent
Harris et al.

(10) Patent No.: US 7,398,100 B2
(45) Date of Patent: Jul. 8, 2008

(54) METHOD, APPARATUS AND SYSTEM FOR USE IN CONTROLLING TRANSMISSION POWER DURING WIRELESS COMMUNICATION

(75) Inventors: John McFarland Harris, Chicago, IL (US); Lee Michael Proctor, Cary, IL (US); Robert Davis Battin, Kildeer, IL (US)

(73) Assignee: Motorola, Inc., Schaumburg, IL (US)

( * ) Notice: Subject to any disclaimer, the term of this patent is extended or adjusted under 35 U.S.C. 154(b) by 773 days.

(21) Appl. No.: 10/611,759

(22) Filed: Jul. 1, 2003

(65) Prior Publication Data
US 2005/0123059 A1   Jun. 9, 2005

(51) Int. Cl.
H04B 7/00 (2006.01)
H04Q 7/20 (2006.01)

(52) U.S. Cl. ...... 455/522; 375/342
(58) Field of Classification Search ........ 375/244, 375/342; 370/342; 455/67.13, 522
See application file for complete search history.

(56) References Cited

U.S. PATENT DOCUMENTS

| | | | |
|---|---|---|---|
| 6,269,331 B1* | 7/2001 | Alanara et al. | 704/205 |
| 6,731,606 B2* | 5/2004 | Lin et al. | 370/252 |
| 6,782,059 B2* | 8/2004 | Lin | 375/340 |
| 7,224,993 B2* | 5/2007 | Meyers et al. | 455/522 |
| 2001/0030954 A1 | 10/2001 | Hameleers et al. | |
| 2002/0086692 A1 | 7/2002 | Chheda et al. | |
| 2003/0033568 A1* | 2/2003 | Harris et al. | 714/748 |
| 2003/0105625 A1 | 6/2003 | Harris et al. | |
| 2003/0142632 A1* | 7/2003 | Lin et al. | 370/252 |
| 2003/0152102 A1 | 8/2003 | Morgan et al. | |
| 2004/0042426 A1 | 3/2004 | Harris et al. | |
| 2004/0100965 A1 | 5/2004 | Proctor et al. | |
| 2004/0203463 A1* | 10/2004 | Chen et al. | 455/67.13 |
| 2005/0276248 A1* | 12/2005 | Butala et al. | 370/332 |
| 2007/0011568 A1* | 1/2007 | Hocevar | 714/758 |

FOREIGN PATENT DOCUMENTS

| | | |
|---|---|---|
| WO | WO 01/69870 A1 | 9/2001 |
| WO | WO 03/013047 A3 | 2/2003 |

OTHER PUBLICATIONS

Pending U.S. Appl. No. 10/306,091, filed Nov. 27, 2002, entitled "Method And Apparatus For Power Control On A Discontinuous Transmission Channel In A CDMA System".
Pending U.S. Appl. No. 10/373,387, filed Feb. 24, 2003, entitled "Method And Apparatus For Predicting A Frame Type".

* cited by examiner

Primary Examiner—Chieh M. Fan
Assistant Examiner—Freshteh N Aghdam (57) ABSTRACT

A method, apparatus and system for accurately identifying discontinuous transmissions (DTX) and enabling the utilization of a dedicated control channel (DCCH) by determining if the frame satisfies a quality check, analyzing at least a portion of bits within the frame if the frame does not satisfy the quality check, determining if the bits analyzed exceed a threshold and identifying the frame as a DTX if the bits fail to exceed the threshold. Some embodiments further count a number of zero bits in a tail end of the frame, determine if the number of zero values exceed the threshold, determine if the frame includes an expected sequence of bits if the number of the zero bits does not exceed the threshold, and identify the frame as the DTX if the frame does not include the expected sequence.

12 Claims, 5 Drawing Sheets

METHOD, APPARATUS AND SYSTEM FOR USE IN CONTROLLING TRANSMISSION POWER DURING WIRELESS COMMUNICATION

FIELD OF THE INVENTION

The present invention relates generally to wireless communication, and more particularly to improved power control for a code division multiple access (CDMA) channel such as a dedicated control channel (DCCH).

BACKGROUND OF THE INVENTION

In some code division multiple access (CDMA) wireless communication systems a radio link protocol (RLP) is employed in an attempt to achieve enhanced reliability in wireless communication. With RLP, if a new wirelessly transmitted frame is not received or is received but cannot be accurately decoded and/or interpreted, the receiving device may transmit a negative acknowledgement (NAK) to the device transmitting the frame after a subsequent frame is received correctly. Upon receipt of the NAK, the transmitting device retransmits the frame. Often, the transmitting device additionally increases transmit power when a NAK is received, and particularly if a predefined number of NAKs are received within a given period or based on a predefined amount of data transmitted.

In order to take full advantage of the NAK, the receiving device must be able to identify when a frame is missing and/or erased. As such, RLP protocol instructs that idle frames be periodically transmitted, such as at the end of a series of data-bearing frames. This allows the receiving device to accurately identify if a final data-bearing frame has not been received. For example, if a receiver receives a first frame (F1) with a first sequence number, a second frame (F2) with an incremented sequence number, and then an idle frame (I4) with a sequence number incremented twice, then the receiving device knows that the third frame (F3) was not received and can issue a NAK for the third frame (F3). Typically, about four to six idle frames are communicated after a series of data bearing frames are communicated (e.g., after a download or upload).

DCCH channels are additionally configured to provide for added capacity by taking advantage of the intermittent nature of speech and other communications by utilizing discontinuous transfer modes (DTX). With the use of DTXs, the transmitting device does not communicate during the periods of silence in speech and other periods of inactivity, instead a DTX is initiated. Because of the nature of DTX, prior receiving devices have been unable to distinguish between the DTX mode and erased frames. As such, previous receiving devices mistakenly identify DTXs as erased frames and requested an unnecessary increase in transmission power, resulting in increased transmission power and reduced capacity.

BRIEF DESCRIPTION OF THE DRAWINGS

The above needs are at least partially met through provision of the method, apparatus, and system for use in identifying DTX, erased and good frames in wireless communication described in the following detailed description, particularly when studied in conjunction with the drawings, wherein.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

These various embodiments provide for methods, systems and equipment or apparatus that can be used to provide communications services and enhance power control and capacity for discontinuous transmission channels, such as dedicated control channels (DCCH) and/or supplemental channels (SCH), in a code division multiple access system (CDMA) or other similar systems. These embodiments accurately distinguish between erased versus never-transmitted frames on DCCH and SCH channels. In accurately distinguishing between erased versus never-transmitted frames the these embodiments avoid the debilitating impact on channel capacities otherwise due to resultant inaccuracies as applied to power control methodologies utilized for these channels.

These embodiments provide for the implementation of one or more DCCH and/or SCH within a wireless communication system employing CDMA. These implementations are particularly advantageous with systems implementing radio link protocol (RLP) or other automatic repeat request (ARQ) schemes or similar request schemes. In part, a preferred embodiment accurately differentiates between erased frames and discontinuous transfers or transmissions (DTX). By accurately identifying erased frames verses DTXs, this embodiment maintains accurate power level controls and enables the use of the DCCH for wireless CDMA communication.

The DCCH channels and supplemental channels (SCHs) employ DTX technology or methodology whereby, in a preferred embodiment, a transmitter is enabled and frames are transmitted over a wireless interface when there is information to send and the transmitter is effectively turned off or disabled when there is no information to send, and/or sends simply minimal control/channel establishment information (such as power control bits and/or dedicated pilots) without any bearer information. In a CDMA system, channel capacity, or in other words the number of calls that can be supported through the CDMA wireless interface, is roughly inversely proportional to the collective transmitted power used by the transmitter, such as constituent subscriber devices. Thus, to maximize the number of active calls, each of the subscriber devices will preferably maintain a minimum transmission power level for maintaining adequate call or link quality.

To aid in maintaining such a minimum transmission power level and adequate call quality, a CDMA reverse DCCH link outer loop power control algorithm is typically implemented at, for example, a mobile switching office of a wireless service provider. The power control algorithm uses, along with other parameters, the determination of whether a transmitted DCCH frame is good, was erased or was never transmitted (DTXd) to control the outer loop threshold (OLT), which is a dynamic parameter that drives the reverse link power (e.g. subscriber transmitter power level) of the DCCH.

Figure 1:
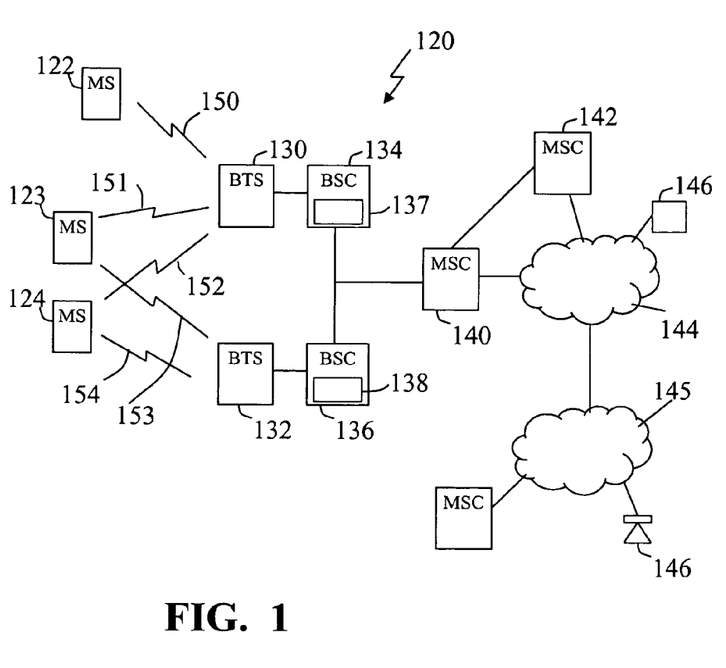
FIG. 1 depicts a simplified block diagram of a wireless communication network that provides wireless communication utilizing a code division multiple access (CDMA) system protocol according to some embodiments.

FIG. 1 depicts a simplified block diagram of a wireless communication network 120 that provides wireless communications according to one embodiment utilizing code division multiple access (CDMA) such as, IS-95 and 95B, CDMA2000, described in CDMA2000 International Telecommunication Union-Radiocommunication (ITU-R) Radio Transmission Technology (RTT) Candidate Submission document, which is incorporated herein by reference, CDMA1X, CDMA1xEV-DO and the like. However, in alternative embodiments the communication network 120 may utilize other digital cellular communication systems such as, but not limited to, previous generations of CDMA, Cellular System Remote unit-Base Station Compatibility Standard of the Electronic Industry Association/Telecommunications Industry Association Interim Standard 2000 (IS2000), the next generation CDMA architectures, for example those described in the UMTS Wideband CDMA SMG2 UMTS Physical Layer Expert Group Tdoc SMG2 UMTS-L1 221/98 (UMTS 221/98), the next generation Global System for Mobile Communications (GSM), the CDMA system as described in "Personal Station-Base Station Compatibility Requirements for 1.8 to 2.0 GHz Code Division Multiple Access (CDMA) Personal Communication System" (American National Standards Institute (ANSI J-STD-008)), or the European Telecommunications Standards Institute (ETSI) Wideband CDMA (W-CDMA), or other similar systems.

Still referring to FIG. 1, the network 120 provides voice and/or data to be wirelessly communicated to and/or from one or more wireless devices 122-124 (e.g., mobile phones, wireless computers, personal digital assistant (PDA), data or messaging device, and the like). The network typically includes one or more base stations (BS) or base transceiver stations (BTS) 130, 132 that include wireless transceivers for wirelessly communicating with the wireless devices 122-124. The wireless devices 122-124 and BTSs provide for the coding, decoding, error checking and correction, frame type determination, power control, wireless transmission and reception and other similar functions.

The BTSs 130, 132 typically couple with one or more base station controllers (BSC) 134, 136 that can include selector distributor units (SDU) 137, 138, and/or mobile switching centers (MSC) 140, 142. The MSCs can couple with a communication network 144, such as a public switched telephone network (PSTN), integrated services digital network (ISDN), other MSCs, other networks and other components of the communication system 120. The communication network 144 can couple with other networks 145.

These embodiments can be implemented within the wireless devices 122-124, the BTSs 130-132, BSCs 134-136, the MSCs 140, and/or other components within the system. Such functionality is best implemented with or in software programs and instructions and/or hardware (e.g., integrated circuits (ICs), application specific integrated circuits (ASIC) and the like), such as ASICs implemented in one or more of the wireless devices, BTSs, BSCs, MSCs or other devices of the system. Based on the present disclosure, one skilled in the art will be readily capable of producing and implementing such software and/or hardware without undo experimentation.

The wireless devices 122-124 can communicate with other wireless devices within the system 120, other wireless device in other wireless systems (not shown), and other hard wired devices 146 (e.g., telephones, servers, computers, and the like). Typically, each wireless device communicates over a wireless link or leg 150-154. Further, each wireless device 122-124 can simultaneously communicate with a plurality of BTSs. Communicating with a plurality of BTSs allows the system to take advantage of handoffs between legs and BTSs 130, 132 to optimize the wireless signal quality and/or coverage.

Figure 2:
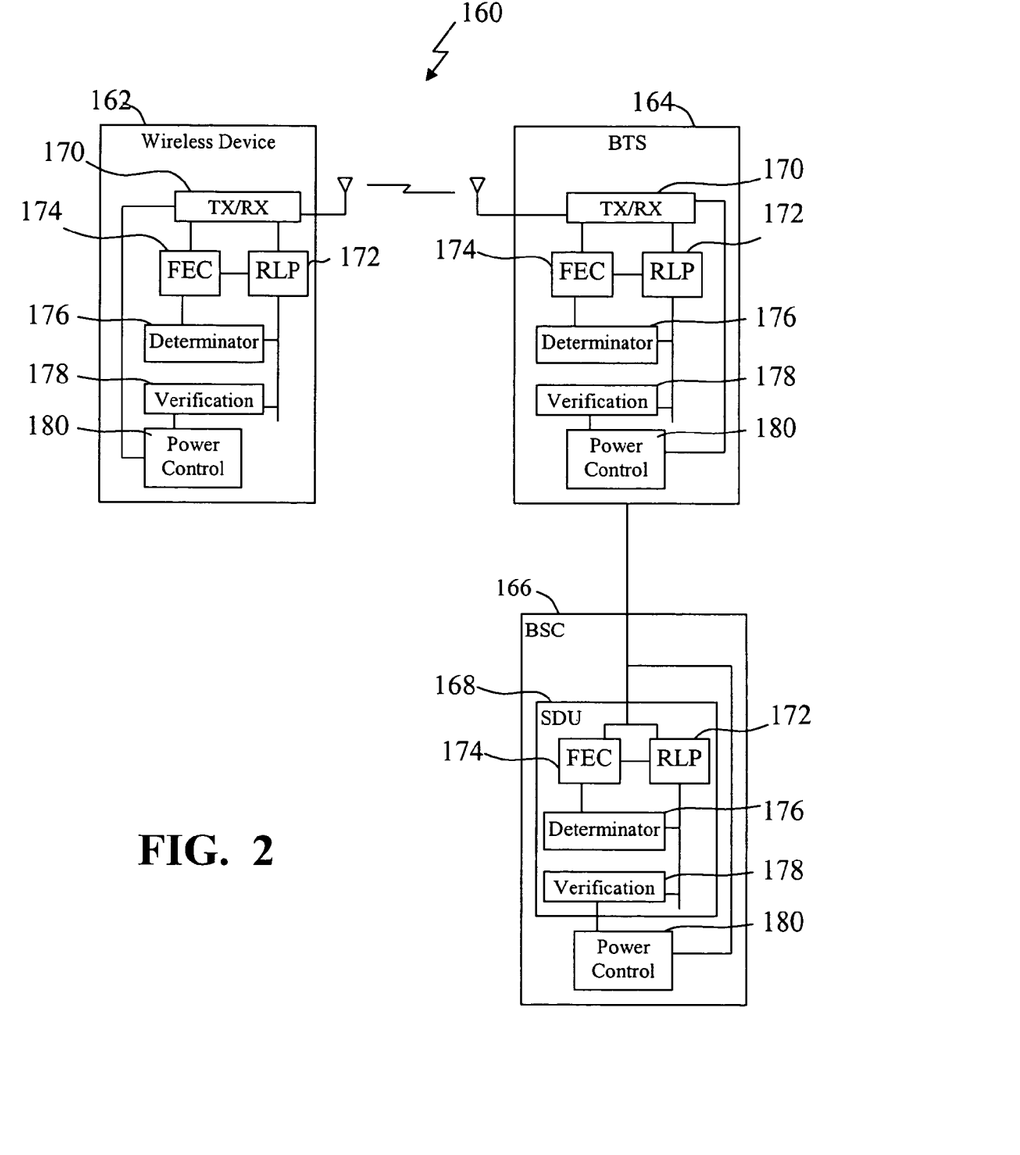
FIG. 2 depicts a block diagram of a simplified system according to some embodiments providing wireless communication with a wireless device.

FIG. 2 depicts a block diagram of a simplified system 160 according to one embodiment that provides wireless communication with a wireless device 162, such as a mobile phone, computer or other similar devices. The wireless system 160 further includes a BTS 164 and a BSC 166. The system is configured to provide wireless communication and enable the use of the DCCH and/or SCH channels. As such, the wireless device 162, the BTS 164 and/or the BSC 166 can be configured to verify the accuracy of received frames, and to distinguish between erased frames and DTXs. As such, each of the wireless device, the BTS and/or the BSC can include a wireless transceiver 170, an RLP generator and/or receiver 172, a forward error coding (FEC) processing and/or decoding device 174, a frame type determinator 176, a frame type verification device 178 and a power control 180. The BSC 166 can additionally include an SDU 168. The SDU can incorporate one or more of the RLP processor 172, the FEC processor and/or decoder, the frame type determinator 176 and the frame type verification.

The RLP generator/receiver 172 receives data from a source application, such as an external personal computer (not shown) or a mobile data application (e.g., a wireless access protocol (WAP) browser (not shown), voice-over-IP application, or a dispatch application) and frames the data into RLP data frames and appends sequentially increasing RLP sequence numbers to the frames for transmission of the frames. Further, the RLP recovers received frames from the frame type determinator 176 if the recovered frames are good, as well as appended frame type indicators (good, erased, DTX). The RLP receiver 172 reconstructs original transmitted data based on the RLP sequence numbers. If the RLP receiver 172 detects a missing sequence number it can request retransmission by sending or causing to be sent a NAK to a transmitting device (e.g., to the wireless device 162 if detected by the BTS 164, or to the BTS if detected by the wireless device). The RLP receiver 172 passes the good frames containing user data to a user application, such as the above-mentioned email server, Internet or personal computer (not shown) via intermediate circuitry. In addition, the RLP receiver 172 extracts the RLP sequence numbers from the received frames (good frames) and passes the RLP sequence numbers as well as outputs from the frame type determinator 176 to the frame type verification processing device 178.

The FEC processing and/or decoding device 174 typically includes a coder (not shown), such as a convolutional or turbo coder, and a cyclic redundancy check (CRC) block for generating and applying overhead bits to the frames framed by the source application to provide for error protection of the frames, and for performing error detection and correction on received frames. The FEC decoding can detect and correct errors induced by the channel thereby recovering original input data, or in other words the original data bits and frames, even when a significant number of errors are present in the received data.

A frame type determinator 176 receives the decoded data frames as well as frame quality information such as symbol error rate (SER), cyclic redundancy check (CRC) results, and frame energy information included in the decoded data frames. From the frame quality information, a rate determination algorithm (RDA) programmed into the frame type determinator 176 determines whether the received frame is good or erased, or whether no frame was transmitted (DTX). The frame type determinator can be configured to further analyze the frames to accurately distinguish between erased frames and DTXs, by in part analyzing the decoded bearer bits within the frame, including the tail end of the frame as well as the header.

The frame type verification processing device 178 is programmed to include a power control algorithm, or PCA, that verifies that the frame determination made by the rate determination algorithm, or RDA, in the frame type determinator 176 was correct, and then accordingly instructs a power control device 180 to transmit either a Step_Up, a Step_Down or Maintain forward link power control message, referred to more generally as power control information, to the transmitting device (e.g., to the wireless device or the BTS) depending on whether the frame is an erased frame, a good frame or a DTX. The power control device 180 preferably indicates the Step_Up, Step_Down or Maintain to the transmitting device by appropriate adjustment of an Outer Loop Threshold (OLT).

The standards for wirelessly communicating using CMDA, such as CDMA2000, provides for the implementation and use of the DCCH channel and/or SCH channel. The DCCH and/or SCH can be used for data services including large data transfers such as file downloads/uploads, Internet access, email functions and other similar functions. The use of DCCH will provide significant improvements over previous versions of CDMA. Some indications suggest that the utilization of the DCCH channel can provide approximately a 50% improvement in capacity. However, because of inaccuracies associated with the DCCH and the effect on power consumption resulting from these inaccuracies, the DCCH has not been implemented in many cases.

One of the significant problems seen in the use of DCCH results from the incorrect identification of a discontinuous transfer (DTX) as an erased frame. A good data frame is a frame that was transmitted and received and properly decoded. An erased frame is a frame that was transmitted and either improperly received or improperly decoded. For purposes of the present discussion, when a frame is not transmitted or the occurrence of a frame non-transmission will be referred to as a DTX frame. Unfortunately a receiver does not know whether a frame has been transmitted and as a result an erased frame and a DTX frame can look identical to a receiver or decoder (e.g., can not be decoded). It has been determined that in some systems a DTX is typically mistaken for an erasure by receivers about 55% or more of the time. This mistaken identification of DTX frame is due to the nature of the DTX, hardware product limitations and BTS rate determination algorithm shortcomings. The incorrectly identified DTXs results in an unnecessary request to increase transmit power. Continued incorrect identification results in further increases in transmit power which can result in interference, wasted power and an overall reduction in network capacity.

Previous systems could not take advantage of the DCCH because the previous systems could not distinguish between erased frames and DTXs. Previous systems alternatively utilized the fundamental channel (FCH). With the FCH, the transmitting device is always sending communication frames that include information bearer data or content, including full frames, ½ frames, ¼ frames and ⅛ frames. Previous systems that did not employ the DCCH did not experience this problem because frames carrying bearer data are always being communicated over the FCH. Because the frames are always being transmitted, it was relatively easy for a receiver to identify when a frame was not received or erased.

Alternatively, with the use of the DCCH, bearer frames do not always have to be communicated. A DTX can be initiated where the transmitting device is effectively turned off or disabled when there is no information to send, and/or where communication is transmitted which does not include bearer data, but instead simply includes minimal power control bits without CRC bits to verify that the bearer data was accurately received. The utilization of DTXs provides for increased CDMA capacity by taking advantage of the intermittent nature of speech and other communications. In DTX, the transmitter is effectively turned off during the periods of silence in speech and other periods of inactivity. Because of the nature of DTX, prior receiving devices have been unable to distinguish between the DTX mode and erased frames. As such, previous receiving devices often mistakenly identify DTXs as erased frames and signal for a retransmission (e.g., NAK), and often request an unnecessary increase in transmission power.

The CDMA reverse DCCH link outer loop power control algorithm provides power control over the DCCH. The outer loop power control uses, along with other parameters, the determination of whether a frame was erased or whether a frame was believed to have never been transmitted (e.g., DTXd). The power control algorithm relies heavily on the accuracy of this determination. Typically, an Outer Loop Threshold (OLT), which drives the reverse link power, is adjusted as follows:

upon reception of a "good" frame that meets predefined criteria (e.g., verified CRC), the OLT is adjusted according to the following:
OLT(i)=OLT(i−1)−(RPC_Step_Down*Step_Down_Factor);

upon reception of an "erased" frame, the OLT is adjusted as follows:
OLT(i)=OLT(i−1)+(RPC_Step_Up*Step_Up_Factor); and upon reception of a DTX frame, the OLT value is unchanged.

The RPC_Step_Up and RPC_Step_Down parameters are typically fixed values, and the Step_Up_Factor and Step_Down_Factor parameters are defined as functions of a target reverse frame erasure rate (FER) and an actual reverse FER.

The DCCH rate determination algorithm (RDA), implemented for example through the wireless device or BTS, is utilized to determine whether a received frame is good, erased or a DTX. The RDA relies on similar information as a fundamental channel (FCH) multi-rate RDA. For example, the RDA can depend on a cyclic redundancy check (CRC) or code verification, symbol error rates (SER), quality metrics and/or other similar quality parameters. For the FCH, inaccurately determined frame rates are a well known problem resulting in audio quality problems, radio link protocol (RLP) aborts and/or other similar problems. However, because FCH mis-determinations are typically very infrequent (i.e., falsing rate<<erasure rate), the resulting FCH power control is not significantly impacted.

However, due to the nature of DTX, hardware (e.g., ASIC) limitations, software limitations, and/or RDA shortcomings, the incorrect determination or falsing rate on the DCCH channel is considerably worse. According to some studies, the probability of an erased frame being detected as DTX is approximately 0.1%. Alternatively, the probability of a DTX being detected as an erasure can be as high as 55%.

As a result of this high mis-determination rate on the DCCH channel, the OLT is often mistakenly increased (as defined by the algorithms provided above) when the OLT should be maintained at a previous level, resulting in unacceptably large power increases, particularly on wireless mobile devices. This negatively and severely affects reverse link capacity. This negative impact is so great that despite DCCH functionality being available for some time, the DCCH functionality has yet to be enabled commercially.

A preferred embodiment resolves these OLT and link capacity issues with the DCCH, as well as the unacceptably large power increases, allowing the DCCH channel to be commercially implemented and allowing wireless communication to take advantage of the considerable capacity gains that are capable through the use of the DCCH.

Figure 3:
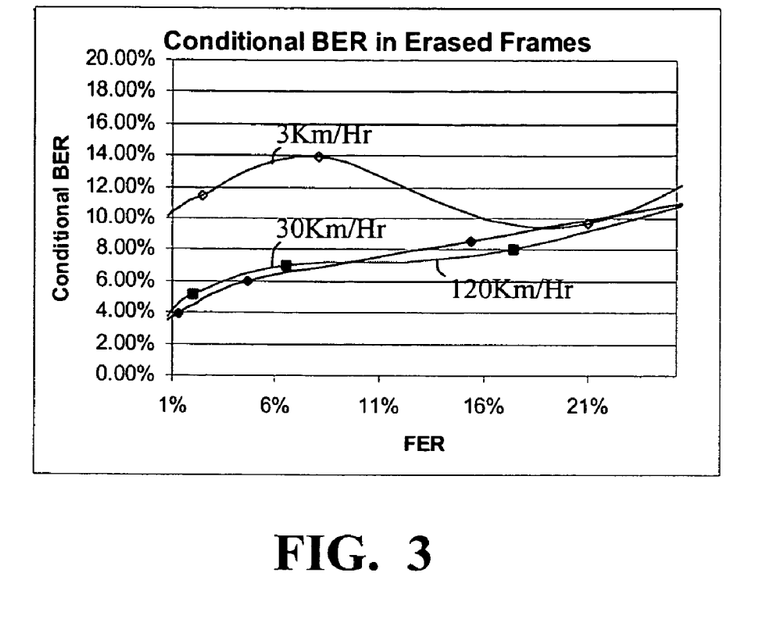
FIG. 3 depicts a simplified graphical representation of a percentage of conditional bit error rates (BER) within a wirelessly communicated erased frame as a function of the frame error rate (FER)

In developing these embodiments, it was determined that within a significant number of erased frames about 90% or more of the bits within the received frame are correct, and this percentage of correct bits is even greater near the tail of the frame and near the beginning or header of the frame. This is particularly true for frames encoded, for example, with convolutional coding or other similar coding that provide a recognizable sequence and with formatted content, such as strings of zero bits. FIG. 3 depicts a simplified graphical representation of a percentage of conditional bit error rates (BER) within an erased frame as a function of the frame error rate (FER). It can be seen that within most erased frames, a large majority of the bits within erased frames are correct.

Figure 4:
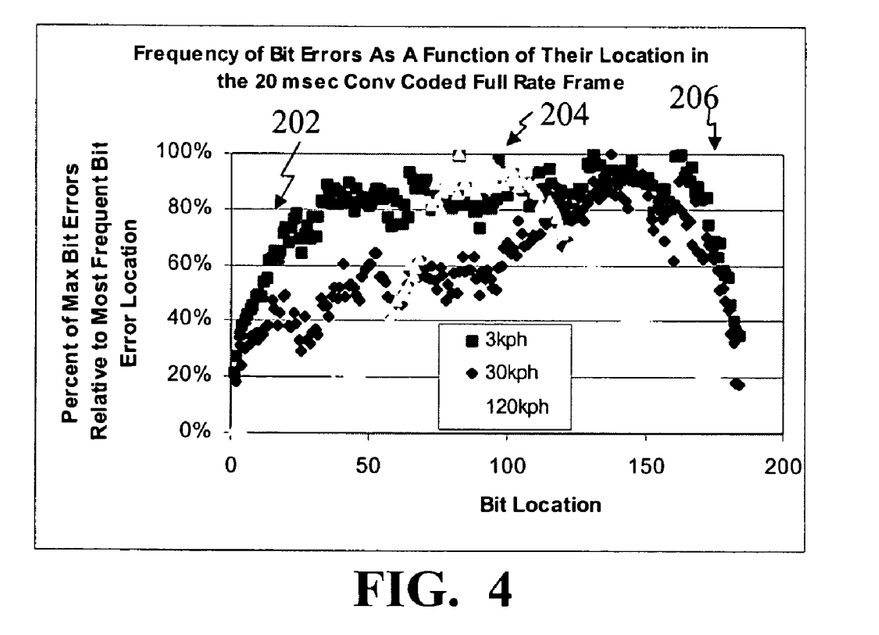
FIG. 4 depicts a simplified graphical representation of a frequency distribution of bits errors detected as a function of the location of the bits within a frame wirelessly communicated.

FIG. 4 depicts a simplified graphical representation of a frequency distribution of bits errors detected as a function of the location of the bits within a frame. The plot was generated utilizing frames that were coded utilizing convolutional coding. The percentage of erroneous bits at the beginning 202 and tail end 204 of the frame are significantly less than the percentage of error bits within the central area 206 of the frame. Further, the percentage of error bits drops significantly to almost zero near the tail end 204 of the frame. Further, in utilizing convolutional coding or other similar coding, bit errors typically occur in a group or a single clump.

As a result of these determinations, this embodiment takes advantage of the accuracy of the bits (typically about 90% or more) throughout the frames, and particularly at the tail end and the beginning of frames to distinguish between erased frames and a DTX.

The inventors additionally discovered that in many systems with typical short transaction workload models, approximately 70% to 90% of the frames wirelessly communicated on a reverse CDMA link are radio link protocol control frames, such as idle frames, negative acknowledgements (NAK), FILL frames and other control frames. Typically, these control frames do not include bearer information, but instead simply include a sequence number and minimal control information. In these RLP control frames, and in particular idles, approximately 140 of the last bearer data bits within such a frame are all zeros (0) (e.g., from padding). Similarly, frames with padding also have large strings of zeros at the tail of the frame. These strings of zeros are defined according to the CDMA standards. It will be apparent to one skilled in the art that other predefined and recognizable series of bits or other fixed patterns can be employed without departing from the inventive aspects of the present invention.

It was further discovered, as a result of the above mentioned factors, in some systems approximately 90% and as much as 99% of erased frames, the tail end of the bearer bits of the frame include at least 65 zero bits. Additionally, it was determined in some systems that in approximately 90% and as much as 99% of DTXs, the tail end of the DTX has less than 51 zero bits.

These embodiments take advantage of these determinations and are configured to identify a large percentage of questionable frames (for example 75% or more) as an erased frame or a DTX by analyzing the bits within a frame. Further, these embodiments take advantage of the fact that typically the beginning of the frame additionally has a higher percentage of accurate bits. Some embodiments further analyze the beginning or header of the frame to determine if a recognized or expected series or sequence of bits, and/or parameters can be identified. If the frame contains a recognized header, the frame is identified as an erased frame which can result in an increase in the OLT, which can in turn result in a legitimate and needed increase in the outer loop power. If the header is not recognized or does not include an expected sequence, such an embodiment assumes the frame is a DTX such that the OLT is maintained at a previous level and thus prevents unnecessary power increases and provides for the utilization of DTXs.

One embodiment provides a variable weighting to the bits within a frame. For example, a predefined number of bearer bits at the end of a frame can be given a highest weighting and thus provide the most bearing on the identification and designation of a frame. Further, the bits located at the beginning and/or the header of a frame can be given a second weighting, while those bits in the central region of the frame are given the lowest weighting or are ignored completely.

Therefore, such an embodiment is capable of accurately identifying approximately 60% of erased frames about 90% of the time based on the bits within the frame tail and/or padding. A preferred embodiment is capable of accurately identifying approximately 75% of erased frames about 98-99% of the time based on the bits within the frame tail and/or padding. These embodiments are further capable of identifying approximately 60%, preferably 80% of the remaining 25%-35% of the unidentified erased frames based on a header of the frame. Thus, some embodiments can identify about at least 85%, and preferably about at least 95% of the erased frames, which is more than adequate to provide for the implementation of the DCCH channel and accurate power control.

Figure 5:
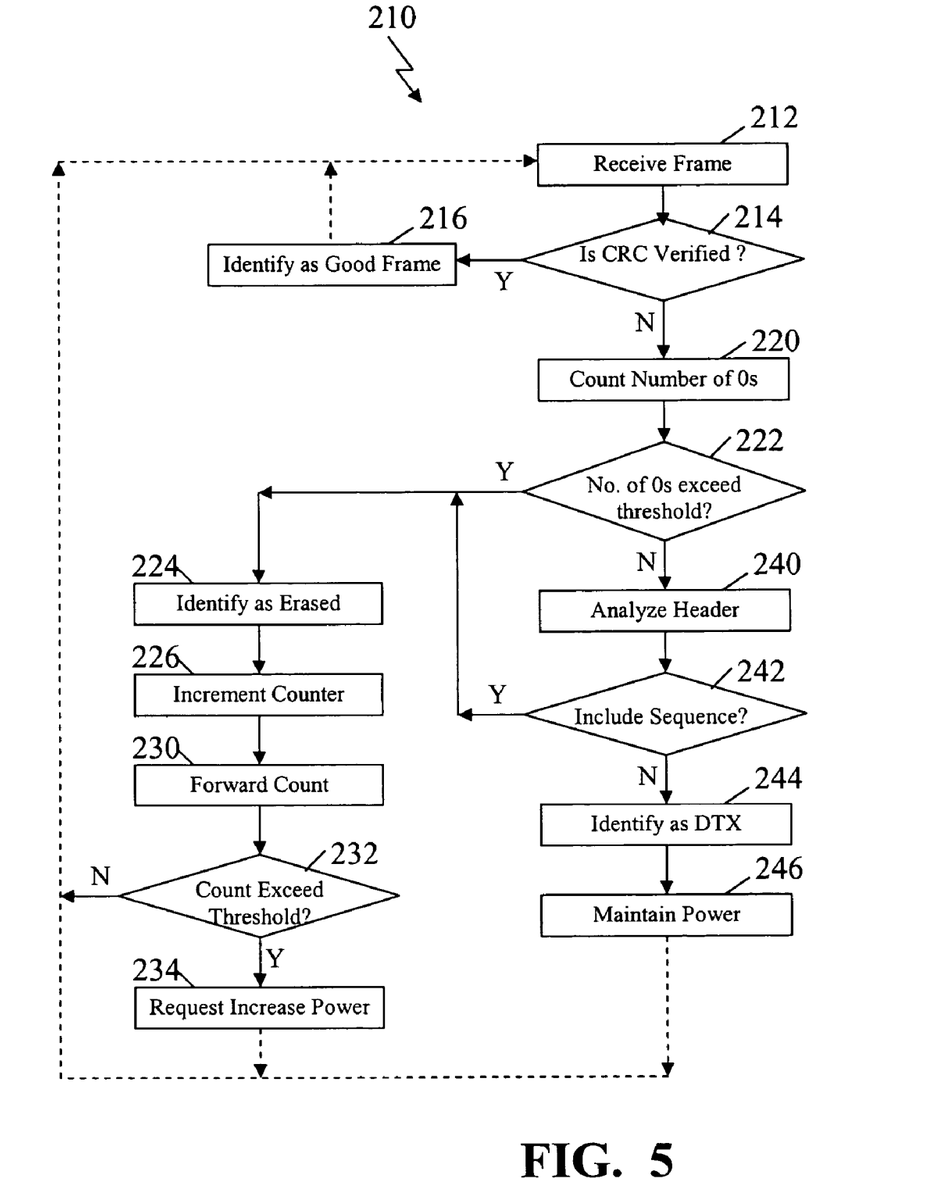
FIG. 5 depicts a simplified flow diagram of a process according to one implementation of one embodiment that can be implemented in the system of FIG. 1 for distinguishing erased frames from discontinuous transfer modes (DTX) and providing accurate power control based on the distinctions.

FIG. 5 depicts a simplified flow diagram of a process 210 according to one implementation of one embodiment for distinguishing erased frames from DTXs and providing accurate power control based on the distinctions. In step 212, a communication is received, for example one or more frames can be wirelessly received. In step 214, the accuracy and/or quality of the received communication is verified. The accuracy can be determined based on any number of verifications and/or checks, such as a verification of a cyclic redundancy check (CRC), a frame quality indicator (FQI), other parity checks and/or other similar quality verifications at the beginning or end of a frame. If the accuracy of the frame is verified (e.g., the CRC bits are verified) the process 210 continues to step 216 where the frame is identified as a good or accurate frame and the frame is forwarded for further processing by the receiver, and the process returns to step 212 to await the receipt of another frame.

If the accuracy of the frame is not verified in step 214, step 220 is entered where at least a portion of the bear bits are analyzed to determine if a pattern is detected. For example, the number of zero bits within a predefined number of bear bits located at or near the tail of the frame can be counted. Additionally and/or alternatively, the total number of zeros can be counted within an entire frame. In step 222 it is determined if the pattern is detected, such as if the number of zero bits in the tail of the frame exceed a predefined bit count threshold and/or if the total number of zero bits within the frame exceed a predefined total zero bit count threshold. For example, does the number of zero bits at the tail exceed a threshold of 60 bits. If the number of zero bits does exceed the bit count threshold, step 224 is entered where the frame is identified as an erased frame. In step 226 a counter is incremented. In step 230, the count is forwarded to a power control. In step 232, it is determined if the count exceeds a predefined count value or threshold. If the count exceeds the power count threshold, step 234 is entered where the receiving device forwards a request to the transmitting device to increase the transmission power or setpoint. In an alternative embodiment, the process 210 does not need to count the number of erased frames received. Alternatively, the process can skip steps 226 through 232, and once a frame is identified as an erased frame in step 224, the process proceeds to step 234 to request an increase in power. The process typically then returns to step 212 to await the reception of further frames.

If it was determined in step 222 that the number of zero bearer bits does not exceed the zero bit count threshold, the process continues to step 240 where a header of the received frame is analyzed. For example, the header can be searched for a sequence number that is equal to the sequence number of the previous frame incremented by one. In step 242, it is determined if the header includes a recognized series or sequence of bits, or if a series of bits meets an expected or predefined pattern. If a sequence is recognized the process proceeds to step 224 where the frame is identified as an erased frame. If a sequence is not recognized, step 244 is entered where the frame is identified as a DTX. In step 246, a power control signal is forwarded to the transmitting device where the power level is maintained at previous levels, or alternatively can be decreased. As such, a power level is typically maintained at previous levels or decreased, preventing unnecessary power increases that can degrade or interfere with the wireless communication and reduce the communication capacity of a wireless system 120.

A preferred embodiment additionally provides for improved performance by detecting an erased frame and forwarding a NAK without having to wait for additional frames to confirm that a frame was in fact erased. For example, if a receiver receives a first and second frame (Frame1, Frame2), then receives "something", such an embodiment can analyze the header of the "something" received. If the header of the "something" includes a sequence number that is one greater than the sequence number of Frame2, then the "something" is verified as an erased Frame3. This can result in the generation of a NAK for Frame3, prior to even receiving a Frame4 and looking at the sequence number of Frame4 to know that Frame3 was erased.

A preferred embodiment can further provide corrections for prior power control adjustments. For example, a receiver can receive a first and second frame (Frame1, Frame2), and then receive "something." If the receiver determines based on an analysis of the header that the "something" is an erased Frame3, the receiver can issue a NAK as well as a power control adjustment to the transmitter. If the next frame received is Frame3, this embodiment recognizes the sequence number and determines that the previous NAK and power control adjustment were incorrectly issued. As such, this embodiment can then issue a correction for the power control adjustment and/or a cancellation of the NAK. Similarly, such an embodiment can provide corrections if it is later determined that a gap in sequence numbers was received and not identified.

The frame analysis and evaluation can be implemented directly in the mobile devices 122-124 (see FIG. 1), in the BTSs 130-132, the BSCs 134, 136 and/or the MSCs 140, 142. In some instances where the analysis is performed in the BSC, for example in the selector distributor unit (SDU) 137, 138 of the BSC, then corrupted or questionable frames may need to be forwarded across the backhaul in the reverse link for analysis. This results in added traffic on the backhaul. However, because there is approximately a 5 to 1 imbalance between forward and reverse data traffic across the backhaul, sending erased frames across the backhaul only minimally affects capacity.

Further, in communicating frame information over the backhaul for analysis at the BSC and/or SDU, the information within the frame can be compressed before sending across the backhaul. In one embodiment, header information and information from the tail of the frame are extracted from the frame, and only the header and tail information are forwarded over the backhaul, which reduces the amount of information communicated across the backhaul. In one embodiment, the number of zero bits in a frame can be counted or the number of zeros in the tail of the frame can be counted and only the total count is to be forwarded across the backhaul. The BSC and/or SDU can utilize the count to determine if a threshold is exceeded indicating an erased frame or a DTX.

Figure 6:
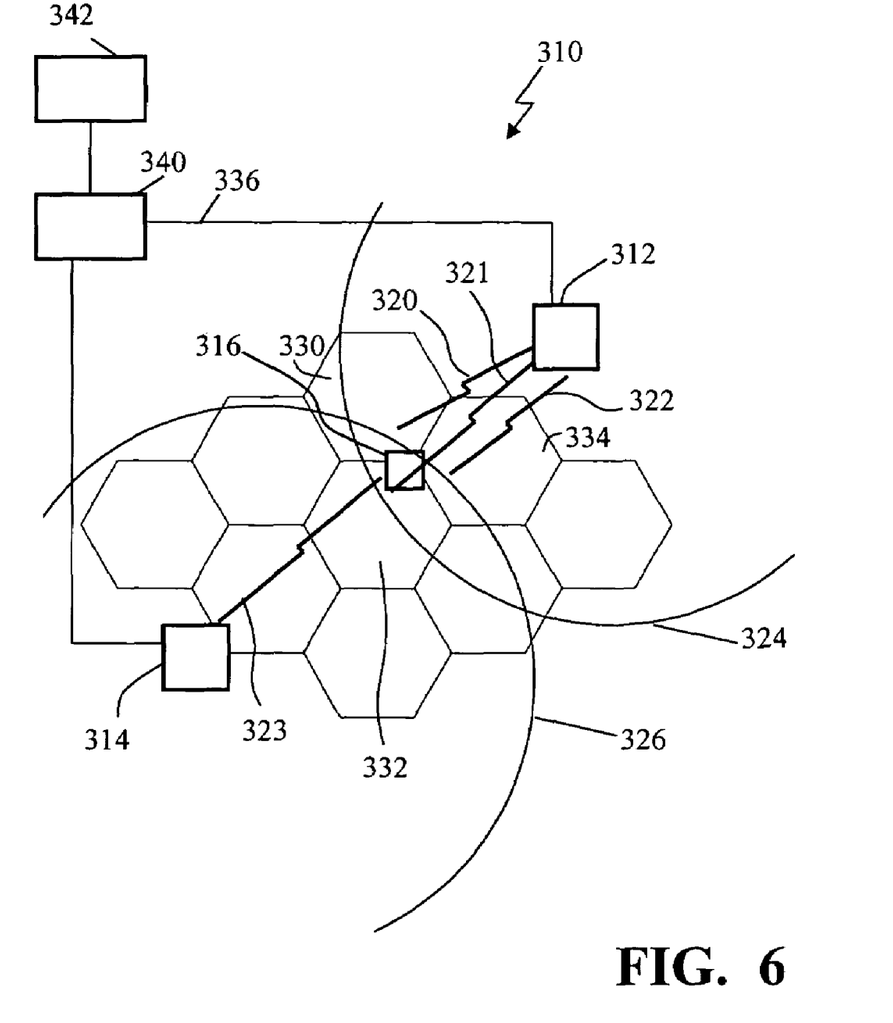
FIG. 6 depicts a simplified block diagram of a portion of a wireless communication system, similar to that of FIG. 1, according to some embodiments.

Some embodiments further verify the received frames and/or DTXs by comparing the value of bits within a frame received over a plurality of paths. For example, a BTS can provide multiple legs or links to communicate with one or more mobile devices, where soft handoffs (SHO) can be initiated between sectors within the same cell. FIG. 6 depicts a simplified block diagram of a portion of a wireless communication system 310 according to one embodiment. The system includes a plurality of BTSs 312, 314 providing wireless communication with one or more wireless mobile devices 316. Each BTS provides wireless coverage over cells 324, 326 of the network. Each cell is divided into sectors or subcells 330, 332, 334. Each BTS further couples with at least one BSC 340, and each BTS can couple with the same BSC or separate BSCs. Typically, the BSC(s) couples with an MSC 342.

Still referring to FIG. 6, if a first BTS 312 within the system 310 receives the same communication from a mobile device over a plurality of wireless links 320-322, for example one link for each of a plurality of sectors, the BTS can utilize the plurality of received signals to obtain the most accurate communication and as a result provide for enhanced determination of whether a frame is good, erased or a DTX. In one embodiment, the BTS can compare communications or frames received over one of the legs 320-322 and select one of the frames to be analyzed and/or forwarded over the backhaul 336 based on predefined criteria. The predefined criteria can include the communication and/or frame with the best symbol error rate (outputted when frame is decoded), the frame received with the most energy or power, other similar criteria and/or combinations of such criteria.

In one embodiment, if the first BTS 312 receives the same frame from a mobile device 316 over a plurality of legs 320-322, the BTS can compare the frames received over the legs, bit by bit to verify the accuracy of the received bits and frame. If the BTS receives a frame from three or more legs, the BTS can compare the frames received from each leg and if there is a discrepancy between the three legs, the BTS can assign the inconsistent bits according to a majority. For example, if a first frame is received over a first leg (Frame1-L1), over a second leg (Frame1-L2) and over a third leg (Frame-L3), the BTS can compare each bit of Frame1-L1, Frame1-L2 and Frame1-L3. If an n-bit in Frame1-L1 (e.g., a zero) is different than the n-bit in Frame1-L2 and Frame1-L3 (e.g., ones), then the BTS assigns the n-bit according to the majority of Frame1-L2 and Frame1-L3 (the n-bit can be assigned a value of one). Once the bits are confirmed the BTS can further analyze the frame to determine if the frame meets the CRC, if the frame is erased and/or if the frame is a DTX. Alternatively, the BTS can then forward the confirmed frame over a backhaul 336 for analysis by a BSC 340 or other component in the system to determine if the frame is good, erased or DTX.

One embodiment additionally configures the BSC 340 to analyze a single frame communicated from a single mobile device and received by two or more separate BTSs 312, 314. In this embodiment, if a mobile device 316 simultaneously communicates with two or more BTSs 312, 314 over separate legs 320-322 and 323, the BTSs can be configured to forward the frame to the BSC. The BSC compares the frames based on predefined criteria and/or bit by bit, as described above, to achieve an accurate frame that can be further analyzed.

Typically, a preferred embodiment will utilize convolutional coding or other similar coding that provides a recognizable sequence and formatted content. Such embodiments can additionally be used with other coding conventions, such as turbo coding. However, because of the more random nature of the ones and zero bits of this coding, the accuracy of distinguishing between erased frames and DTXs is reduced.

Alternatively, these embodiments can be implemented such that convolutional coding is used on the SCH, because many of these embodiments enable the use of DCCH, which in turn limits, and preferably avoids the need to send the eighth rate frames on the FCH. The achieved gains enables the use of a DCCH with convolutional coded SCH having less radio frequency (RF) cost than a FCH with turbo codes.

These embodiments also provide a simplified process for determining if a wireless communication system is enabling the use of the DCCH by analyzing the received frames in accordance with these embodiments. The process is initiated by communicating a first frame or a first series of frames over one or more reverse links, where the frames are fixed such that the CRCs and/or FQIs are bad indicating that the frame was inaccurately received. Further, the frames are configured such that the bearer information does not include long strings of zero bits, and preferably have relatively short strings of zero bits or alternating ones and zeros. The bad CRCs cause the receiver of the frames to determine the frames are bad even though the receiver actually receives an accurate frame. The properly configured receiver analyzes the frame and based on the fact that there is not a string of zeros exceeding a threshold (e.g., 55 or 60 zeros), determines the frame is a DTX. Because the frames are determined to be DTXs, the receiver will not request an increase in transmission power.

A second frame or second series of frames are subsequently communicated over the one or more links. The second frame or series of frames are communicated again with bad CRCs, FQIs or other quality checks or parameters. However, the frames are configured to include a series or long string of zeros (e.g., a large string of zeros in the tail of the frames). The receiving device detects the bad CRCs and determines the frames are bad, even though the receiver receives the correct bits. The receiver further analyzes the frames, detects the series of zero bits and determines the frames are erased frames. As such, the receiver issues commands to increase transmission power confirming that the system is utilizing the present invention to distinguish erased frames from DTXs and to enable the use of the DCCH.

These embodiments provide methods, systems and apparatuses for use in accurately identifying discontinuous transmission (DTX), enabling the utilization of DCCH and/or SCH channels. In one embodiment, a method includes receiving a wireless communication containing a frame having a plurality of bits; determining if the frame passes a predefined quality parameter; analyzing at least a tail end of the bits within the frame if the frame does not pass the predefined quality parameter; determining if the frame is an erased frame based on the analyzing of the at least the tail end of the bits within the frame; and requesting an increase in a transmit power if the frame is an erased frame. The method can further include determining if the frame is a discontinuous transmission mode (DTX) frame, including analyzing a header of the frame and maintaining the transmit power at a previous level if the frame is a DTX, wherein the determining if the frame is a DTX frame includes comparing at least a portion of the header with a previously received sequence number.

One embodiment provides a method for use in enabling wireless communication. The method includes receiving a wireless communication containing a frame having a plurality of bits; determining if the frame satisfies a quality check; analyzing at least a portion of the bits within the frame if the frame does not satisfy the quality check; determining if the at least the portion of bits analyzed exceeds a threshold; and identifying the frame as a DTX if the at least the portion of the bits fail to exceed the threshold. Some embodiments further include determining if the frame includes an expected sequence of bits; and performing the identifying the frame as the DTX if the frame does not include the expected sequence, wherein analyzing at least the portion of the bits includes counting a number of bits with predefined values; and the determining if the at least the portion of bits analyzed exceeds a threshold includes determining if the number of bits with the predefined values exceeds the threshold.

These embodiments further provide a system and apparatus for use in providing wireless communication. In some embodiments, the apparatus includes a transceiver, a frame error code decoder, a frame type determination device and a frame type verification device. The transceiver receives a wireless communication containing a frame having a plurality of bits. The frame error code decoder is configured to determine if the frame satisfies a quality check. The frame type determination device couples with the frame error code decoder, such that the frame type determination device is configured to analyzes at least a portion of the bits within the frame if the frame does not satisfy the quality check and to determine if the at least the portion of bits analyzed exceeds a threshold. The frame type verification device couples with the frame type determination device, such that frame type verification device is configured to identify the frame as a DTX if the at least the portion of the bits fail to exceed the threshold.

Some embodiments provide an apparatus for use in providing wireless communications that includes means for receiving a wireless communication containing a frame having a plurality of bits; means for determining if the frame satisfies a quality check; means for analyzing at least a portion of the bits within the frame if the frame does not satisfy the quality check; means for determining if the at least the portion of bits analyzed exceeds a threshold; and means for identifying the frame as a DTX if the at least the portion of the bits fail to exceed the threshold.

While the invention herein disclosed has been described by means of specific embodiments and applications thereof, numerous modifications and variations could be made thereto by those skilled in the art without departing from the scope of the invention set forth in the claims.

What is claimed is:

1. A method for use in identifying a frame type of one or more frames wirelessly communication, comprising:
   receiving a wireless communication containing a frame having a plurality of bearer bits;
   determining when the frame passes a predefined quality parameter;
   analyzing at least a portion of the bearer bits within the frame when the frame does not pass the predefined quality parameter;
   determining when the frame is an erased frame based on the analyzing of the portion of the bearer bits within the frame;
   determining when the frame is a discontinuous transmission mode (DTX) frame, based on the analyzing of the portion of the bearer bits within the frame comprising analyzing a header of the frame; and
   determining when the header comprises an expected series of bits.

2. The method of claim 1, farther comprising:
   requesting an increase in a transmit power when the frame is an erased frame; and
   maintaining the transmit power when the header comprises an expected series of bits.

3. The method of claim 1, wherein the determining when the frame is a DTX frame comprises comparing at least a portion of the header with a previously received sequence number.

4. The method of claim 1, farther comprising:
   defining the frame as an erased frame when the header comprises the expected series.

5. A method for use in identifying a frame type of one or more frames wirelessly communication, comprising:
   receiving a wireless communication containing a frame having a plurality of bearer bits;
   determining when the frame passes a predefined quality parameter;
   analyzing at least a portion of the bearer bits within the frame when the frame does not pass the predefined quality parameter;
   determining when the frame is an erased frame based on the analyzing of the portion of the bearer bits within the frame;
   wherein the analyzing the portion of the bits comprising counting a number of zero bearer bits within at least a tail end of the frame;
   determining when the number of zero bits exceeds a predefined threshold; and
   defining the frame as an erased frame when the number of zero bits exceeds the predefined threshold.

6. The method of claim 5, wherein the analyzing the portion of the bits comprises:
   determining when a header comprises an expected sequence when the number of zero bits does not exceed the predefined threshold;
   defining the frame as an erased frame when the header comprises the expected parameter; and
   defining the frame as a DTX frame when the header does not comprise the expected parameter.

7. A method for enabling wireless communication, comprising:
   receiving a wireless communication containing a frame having a plurality of bits;
   determining when the frame satisfies a quality check;
   analyzing at least a portion of the bits within the frame when the frame does not satisfy the quality check;
   determining when the at least the portion of the bits analyzed exceeds a threshold; and
   determining when the frame comprises an expected sequence of bits; when the analyzing of the at least the portion of the bits fails to exceed the threshold and
   identifying the frame as the DTX when the frame does not comprise the expected sequence.

8. The method of claim 7, wherein the analyzing the at least the portion of the bits comprises counting a number of bearer bits with zero values in a tail end of the frame;
   the determining when the at least the portion of bits analyzed exceeds the threshold comprises determining when the number of bearer bits with zero values in the tail end exceeds the threshold; and
   initiating the determining when the frame comprises the expected sequence of bits when the number of bearer bits with the zero values in the tail end does not exceed the threshold.

9. A method for enabling wireless communication, comprising:
   receiving a wireless communication containing a frame having a plurality of bits;
   determining when the frame satisfies a quality check;
   analyzing at least a portion of the bits within the frame when the frame does not satisfy the quality check;
   determining when the at least the portion of the bits analyzed exceeds a threshold; and
   identifying the frame as an erased frame when the at least the portion of the bits analyzed exceeds the threshold; and
   controlling a power when the frame is identified as an erased frame determining when the frame comprises an expected sequence of bits;
   when the analyzing of the at least the portion of the bits fails to exceed the threshold
   identifying the frame as the DTX when the frame does not comprise the expected sequence; and
   the identifying the frame as an erased frame comprises identifying the frame as an erased frame when the frame comprises the expected sequence of bits.

10. An apparatus for use in providing wireless communication, comprising:
   a transceiver that receives a wireless communication containing a frame having a plurality of bits;
   a frame error code decoder configured to determine when the frame satisfies a quality check;
   a frame type determination device coupled with the frame error code decoder, wherein the frame type determination device is configured to analyze at least a portion of the bits within the frame when the frame does not satisfy the quality check and to determine whether the at least the portion of bits analyzed a threshold; and a frame type verification device coupled with the frame type determination device, wherein the frame type verification device is configured to identify the frame as a discontinuous transmission mode (DTX) when the at least the portion of the bits fail to exceed the threshold
a radio link protocol (RLP) receiver coupled with the transceiver, wherein the RLP receiver is configured to determine when the frame comprises an expected sequence of bits; and
the frame type determination further initiates the frame type verification device to identify the frame as the DTX when the frame does not comprise the expected sequence.

11. The apparatus of claim 10, wherein the frame type determination device is further configured to count a number of bits with predefined values, and determine when the number of bits with the predefined values exceeds the threshold.

12. The apparatus of claim 10, farther comprising a base transceiver station comprising the transceiver, the frame error code decoder, the frame type determination device and the frame type verification device.

* * * * *